(12) United States Patent
Hwang et al.

(10) Patent No.: US 12,537,201 B2
(45) Date of Patent: Jan. 27, 2026

(54) BATTERY CELL AND BATTERY MODULE INCLUDING THE SAME

(71) Applicant: SK On Co., Ltd., Seoul (KR)

(72) Inventors: Chang Mook Hwang, Daejeon (KR); Jong Hyeok Lee, Daejeon (KR); Yoon Ji Jo, Daejeon (KR)

(73) Assignee: SK On Co., Ltd., Seoul (KR)

( * ) Notice: Subject to any disclaimer, the term of this patent is extended or adjusted under 35 U.S.C. 154(b) by 584 days.

(21) Appl. No.: 17/941,256

(22) Filed: Sep. 9, 2022

(65) Prior Publication Data

US 2023/0207811 A1 Jun. 29, 2023

(30) Foreign Application Priority Data

Dec. 29, 2021 (KR) .................. 10-2021-0191243

(51) Int. Cl.
| | |
|---|---|
| *H01M 50/211* | (2021.01) |
| *H01M 4/02* | (2006.01) |
| *H01M 4/60* | (2006.01) |
| *H01M 4/62* | (2006.01) |
| *H01M 50/46* | (2021.01) |
| *H01M 50/521* | (2021.01) |

(52) U.S. Cl.
CPC .......... *H01M 4/604* (2013.01); *H01M 4/625* (2013.01); *H01M 50/211* (2021.01);
(Continued)

(58) Field of Classification Search
CPC .... H01M 4/604; H01M 4/625; H01M 50/211; H01M 50/46; H01M 50/521;
(Continued)

(56) References Cited

U.S. PATENT DOCUMENTS

2009/0023059 A1 1/2009 Kinoshita et al.
2013/0216887 A1* 8/2013 Wayne .............. H01M 10/6551
165/185
(Continued)

FOREIGN PATENT DOCUMENTS

EP 3796437 A1 3/2021
JP 2005100804 * 4/2005
(Continued)

*Primary Examiner* — Lisa S Park
(74) *Attorney, Agent, or Firm* — The Webb Law Firm

(57) ABSTRACT

A battery cell includes a case provided with an accommodation space; and an electrode assembly accommodated in the accommodation space and contacting the case. The electrode assembly includes a negative electrode including a plurality of negative electrode current collectors, on which a negative electrode mixture is coated, and a deformation absorbing member interposed between the plurality of negative electrode current collectors; a positive electrode including a positive electrode current collector on which a positive electrode mixture is coated; and a separator interposed between the negative electrode mixture and the positive electrode mixture. The deformation absorbing member may be interposed between surfaces, opposing a surface on which the negative electrode mixture is coated, of the negative electrode current collector and may be pressurized or stretched by at least one of the negative electrode and the positive electrode to contract or expand.

16 Claims, 7 Drawing Sheets

(52) U.S. Cl.
CPC ......... *H01M 50/46* (2021.01); *H01M 50/521* (2021.01); *H01M 2004/021* (2013.01)

(58) Field of Classification Search
CPC ......... H01M 2004/021; H01M 50/474; H01M 50/489; H01M 50/491; H01M 10/0468; H01M 50/172; H01M 50/204; H01M 50/244; H01M 10/4235; H01M 10/0413; H01M 10/0436; Y02E 60/10
See application file for complete search history.

(56) References Cited

U.S. PATENT DOCUMENTS

2016/0204466 A1     7/2016  Nogami et al.
2020/0358057 A1*   11/2020  Lindstrom ........ H01M 10/6551
2021/0159544 A1     5/2021  Choi et al.
2022/0328909 A1    10/2022  Lee

FOREIGN PATENT DOCUMENTS

| JP | 2010170832 | * | 8/2010 |
| JP | 2012089446 A | | 5/2012 |
| KR | 1020130115425 A | | 10/2013 |
| KR | 1020150061380 A | | 6/2015 |
| KR | 1020160048894 A | | 5/2016 |
| KR | 20170095604 | * | 8/2017 |
| KR | 1020170095604 A | | 8/2017 |
| KR | 1020210003896 A | | 1/2021 |
| KR | 1020210064691 A | | 6/2021 |
| KR | 1020210150924 A | | 12/2021 |

* cited by examiner

BATTERY CELL AND BATTERY MODULE INCLUDING THE SAME

CROSS-REFERENCE TO RELATED APPLICATION

This application claims priority to Korean Patent Application No. 10-2021-0191243 filed Dec. 29, 2021, the disclosure of which is hereby incorporated by reference in its entirety.

BACKGROUND OF THE INVENTION

1. Field of the Invention

The present disclosure relates to a battery cell and a battery module including the same.

2. Description of Related Art

Secondary batteries may be charged with and discharged of electricity and may be applied to devices within various fields such as mobile electronic devices having relatively small sizes to vehicles and power storage devices having medium and large sizes. Among such secondary batteries, lithium secondary batteries have advantages in terms of high operating voltages and energy density per unit weight, a high charging speed, as well as weight reduction.

A lithium secondary battery has a form in which an electrode assembly including a negative electrode, a positive electrode, and a separator interposed therebetween is accommodated in an external material and an electrolyte is injected. The external material may have various shapes such as a pouch shape, a prismatic shape, and a circular shape.

The negative electrode and the positive electrode of the lithium secondary battery may be formed by coating a slurry containing an electrode active material, a binder, a conductive material, and the like, on a surface of a current collector. While such a lithium secondary battery may be repeatedly charged and discharged, an electrode active material or particles constituting the electrode active material may repeatedly expand and contract due to an electrochemical action of lithium ions.

Although the amount of expansion and contraction of the negative electrode and the positive electrode varies depending on the type of an electrode active material, the repeated expansion and contraction of the negative electrode and the positive electrode may cause deformation of a case accommodating an electrode assembly.

PRIOR ART DOCUMENTS

[Patent Document]
(Patent Document 1) Korean Patent Publication No. 10-2013-0115425 A (Oct. 22, 2013)

SUMMARY OF THE INVENTION

An aspect of the present disclosure is to deal with expansion and contraction of an electrode, accommodated in a case, inside the case.

Another aspect of the present disclosure is to prevent an exterior of a case from being deformed, even when charging and discharging are repeated.

According to an aspect of the present disclosure, a battery cell includes: a case provided with an accommodation space; and an electrode assembly accommodated in the accommodation space and contacting the case. The electrode assembly includes: a negative electrode including a plurality of negative electrode current collectors, on which a negative electrode mixture is coated, and a deformation absorbing member interposed between the plurality of negative electrode current collectors; a positive electrode including a positive electrode current collector on which a positive electrode mixture is coated; and a separator interposed between the negative electrode mixture and the positive electrode mixture. The deformation absorbing member may be interposed between surfaces, opposing a surface on which the negative electrode mixture is coated, of the negative electrode current collector and may be pressurized or stretched by at least one of the negative electrode and the positive electrode to contract or expand.

The positive electrode may include a plurality of positive electrode current collectors, and the deformation absorbing member may be interposed between surfaces, opposing a surface on which the positive electrode mixture is coated, of the positive electrode current collector.

Each of the negative electrode and the positive electrode may be provided in plural, and the separator may be disposed between the negative electrode and the positive electrode.

The deformation absorbing member may be formed of a material including conductive plastic having a porosity of 50% or more to 70% or less.

The deformation absorbing member may be formed of a material containing polyacetylene.

The deformation absorbing member may be formed of conductive plastic including a carbon-base filler.

The deformation absorbing member may be bonded to at least one of the negative electrode current collector and the positive electrode current collector.

In the battery cell, c−c'=d(e−1), where c is an initial thickness of the deformation absorbing member, c' is a maximum deformable thickness of the deformation absorbing member, d is an initial thickness of the negative electrode mixture, and e is a ratio of an expanding thickness of the negative electrode mixture to an initial thickness of the negative electrode mixture.

The case may be provided to maintain an initial width of the accommodation space in a direction, in which the negative electrode, the separator, and the positive electrode are stacked, while the expanding thickness of the negative electrode mixture has a value of more than 100% to 125% or less of the initial thickness of the negative electrode mixture and the expanding thickness of the positive electrode mixture has a value of more than 100% to 125% or less of the initial thickness of the positive electrode mixture.

A sum of thicknesses of the plurality of negative electrodes, present in the accommodation space, may be 5 mm or more to 6 mm or less, and a sum of thicknesses of the plurality of positive electrodes, present in the accommodation space, may be 3 mm or more to 4 mm or less, a thickness of a separator interposed between the negative electrode and the positive electrode in the accommodation space may be at least 15 μm, and the initial width of the accommodation space in the direction, in which the negative electrode, the separator, and the positive electrode are stacked, may be 8 mm or more to 11 mm or less.

A thickness of one of the negative electrode current collectors of the electrode assembly may be at least 5 μm, the negative electrode mixture of the electrode assembly may be coated on one surface of the negative electrode current collector to have a thickness of at least 55 μm, and a thickness of one of the deformation absorbing members of the electrode assembly may be at least 27 μm or more to 30 μm or less.

According to another aspect of the present disclosure, a battery module includes: a module housing; and a battery cell including a case provided with an accommodation space and an electrode assembly accommodated in the accommodation space and contacting the case, the electrode assembly including a negative electrode including a plurality of negative electrode current collectors, on which a negative electrode mixture is coated, and a deformation absorbing member interposed between the plurality of negative electrode current collectors, a positive electrode including a positive electrode current collector on which a positive electrode mixture is coated, and a separator interposed between the negative electrode mixture and the positive electrode mixture, and the deformation absorbing member being interposed between surfaces, opposing a surface on which the negative electrode mixture is coated, of the negative electrode current collector and being pressurized or stretched by at least one of the negative electrode and the positive electrode to contract or expand.

The battery cell may include a plurality of battery cells, and the plurality of battery cells may be stacked in the module housing and supported by the module housing.

The battery module may further include: at least one pad disposed between the battery cells and contacting the battery cell.

The case of the battery cell may be a pouch-type case.

The pad may be formed of a material having thermal conductivity of 1 W/mK or more to 20 W/mK or less.

BRIEF DESCRIPTION OF DRAWINGS

The above and other aspects, features, and advantages of the present disclosure will be more clearly understood from the following detailed description, taken in conjunction with the accompanying drawings.

DESCRIPTION OF THE INVENTION

Figure 1:
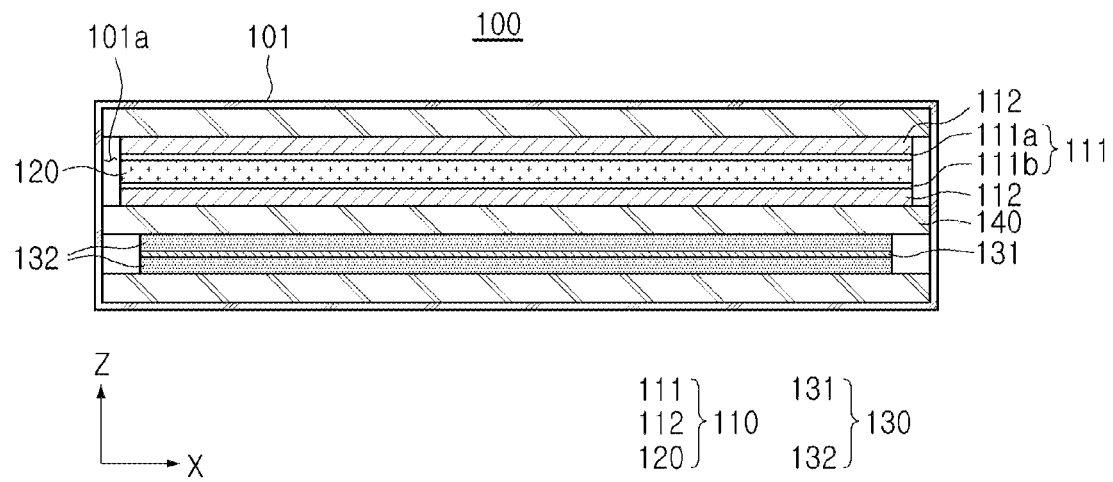
FIG. 1 is a schematic view illustrating a structure of a battery cell according to an exemplary embodiment in the present disclosure.

In order to facilitate an understanding of the description of the exemplary embodiment of the present disclosure, the same reference numerals are used for the same elements in the accompanying drawings, and related elements among elements performing the same function in each exemplary embodiment are denoted by the same number or the number of extension.

Further, in order to clarify the gist of the present disclosure, a description of elements and techniques well known in the prior art will be omitted, and the present disclosure will be described in detail with reference to the accompanying drawings.

It is to be understood, however, that the spirit and scope of the present disclosure are not limited to the exemplary embodiments illustrated, but other forms may be suggested by those skilled in the art while specific components are added, changed, and deleted, which also included within the scope of the same idea as the present disclosure.

Hereinafter, an X-axis illustrated in the accompanying drawings is a direction parallel to a width direction of a secondary battery, a Y-axis is a direction parallel to a thickness direction of the secondary battery, and a Z-axis is a direction parallel to a height direction of the secondary battery.

A structure of a battery cell 100 according to an exemplary embodiment is illustrated in FIG. 1.

As illustrated of FIG. 1, the battery cell 100 according to an exemplary embodiment may include a case 101 provided with an accommodation space 101a. A negative electrode 110, a positive electrode 130, and a separator 140 may be disposed in the accommodation space 101a of the case 101. The separator 140 may be interposed between the cathode 110 and the anode 130, and an internal surface of the case 101 may be in contact with the separator 140. In addition, the accommodation space 101a may be filled with an electrolyte solution.

In an exemplary embodiment, the negative electrode 110 may include a plurality of negative electrode current collectors 111, a deformation absorbing member 120 interposed between the plurality of negative electrode current collectors 111, and negative electrode mixtures 112, respectively applied to surfaces opposing surfaces, contacting the deformation absorbing member 120, of the plurality of negative electrode current collectors 111.

The plurality of negative electrode current collectors 111 may include a first negative electrode current collector 111a and a second negative electrode current collector 111b. The first negative electrode current collector 111a and the second negative electrode current collector 111b may be formed of a material including copper, gold, stainless steel, nickel, aluminum, titanium, or alloys thereof. However, the material is not limited by the present disclosure, and may be appropriately selected and applied according to the usage environment of the electrode assembly, specifications required for the electrode assembly, and/or the like.

The negative electrode mixture 112 is applied to each of one surface of the first negative electrode current collector 111a and one surface of the second negative electrode current collector 111b, and may be in the form of a slurry in which a negative electrode active material, a binder, a conductive material, a dispersant, and the like, are mixed and stirred. The negative electrode mixture 112 may be applied to one surface of the first negative electrode current collector 111a and the second negative electrode current collector 111b, and may then be compressed and dried.

The first negative electrode current collector 111a and the second negative electrode current collector 111b may be disposed such that surfaces thereof, on which the negative electrode mixture 112 is applied, do not face each other. In addition, the deformation absorbing member 120 may be interposed between the other surface of the first negative electrode current collector 111*a* and the other surface of the second negative electrode current collector 111*b* in a state in which the other surfaces of the first and second negative electrode current collectors 111*a* and 111*b* face each other.

In an exemplary embodiment, the deformation absorbing member 120 may be formed of a material having elasticity. The deformation absorbing member 120 may be attached to each of the first negative electrode current collector 111*a* and the second negative electrode current collector 111*b*. Accordingly, the deformation absorbing member 120 may be pressurized by at least one of the first negative electrode current collector 111*a* and the second negative electrode current collector 111*b* to contract in a direction, parallel to a Z-axis, when the negative electrode mixture 112 expands in the direction, parallel to the Z-axis.

When the negative electrode mixture 112 returns to an original state while contracting from the expanding state, during contraction of the negative electrode mixture 112, the first negative electrode current collector 111*a* and the second negative electrode current collector 111*b* may be moved in different directions by the contraction of the negative electrode mixture 112 and a distance between the first negative electrode current collector 111*a* and the second negative electrode current collector 111*b* in the Z-axis direction may be gradually increased.

Accordingly, the volume of the deformation absorbing member 120 attached to each of the first negative current collector 111*a* and the second negative current collector 111*b* may expand in a direction, parallel to the Z-axis, to return to an original volume while the deformation absorption member 120 is stretched by the first negative electrode current collector 111*a* and the second negative electrode current collector 111*b*.

The battery cell 100 according to an exemplary embodiment may be a prismatic or cylindrical battery cell. The case 101 of the prismatic or cylindrical battery cell may be formed of a material containing aluminum, and a cross-sectional shape thereof may be prismatic or circular. Although the case 101 having a rectangular cross-sectional shape is illustrated in FIG. 1, the case 101 may have a circular cross-section when the battery cell 100 is cylindrical.

When the battery cell 100 is prismatic or cylindrical, the case 101 of the battery cell 100 has a rigidity of a predetermined level or higher. Accordingly, in the case 101, a width of the accommodation space 101*a* in the Z-axis direction may not be changed even when at least one of the negative electrode mixture 112 and the positive electrode mixture 132 expands in the Z-axis direction.

Accordingly, if the battery cell 100 has a structure in which the negative electrode, the positive electrode 130, and the separator 140 contact each other and the separator contacts an internal surface of the case 101 having the rigidity of the predetermined level or higher, the deformation absorbing member 120 may contract or expand in the Z-axis direction when a thickness of at least one of 112 and the positive electrode mixture 132 expands or contracts.

Accordingly, when a battery module or battery pack is configured by providing a plurality of prismatic or cylindrical battery cells 100, an additional member dealing with a change in the thickness of the case 101 of the battery cell 100 does not need to be provided in a module housing (not illustrated) or a pack housing (not illustrated) accommodating the battery cells 100. This is because the battery cell 100 according to an exemplary embodiment may deal with a change in thickness of at least one of the negative electrode mixture 112 and the positive electrode mixture 132 in the case 101. Therefore, when configuring the battery module (not illustrated) or the battery pack (not illustrated), materials required for assembling may be significantly reduced and assembly efficiency may be improved.

The deformation absorbing member 120 may be compressed by at least one of the negative electrode mixture 112, the negative electrode current collector 111, and the positive electrode 130 to expand or contract by the negative electrode current collector 111 while a state of charge (SOC) of the battery cell 100 changes from 0% to 100%.

SOC 0%, a state of charge of 0%, refers to a fully discharged state. SOC 100%, a state of charge of 100%, refers to a fully charged state.

In the cross-section of the negative electrode 110 in the Z-axis direction, the deformation absorbing member 120 may continuously contact the other surface of the first negative current collector 111*a* and the other surface of the second negative electrode current collector 111*b* in a width direction of the first negative electrode current collector 111*a* and the second negative electrode current collector 111*b*.

In an exemplary embodiment, the other surface of the first negative electrode current collector 111*a* and the other surface of the second negative electrode current collector 111*b* may contact an entire surface of the deformation absorbing member 120.

In addition, in an exemplary embodiment, the deformation absorbing member 120 may be bonded to the first negative electrode current collector 111*a* and the second negative electrode current collector 111*b* by an adhesive.

Accordingly, the expansion and contraction of the negative electrode mixture 112 in a width direction of the entire first negative electrode current collector 111*a* and the second negative electrode current collector 111*b* may be dealt with, and binding between the deformation absorbing member 120 and the first and second negative electrode current collectors 111*a* and 111*b* may be firmly maintained.

In an exemplary embodiment, the deformation absorbing member 120 may be formed of a material including conductive plastic having a porosity of 50% or more to 70% or less.

In an exemplary embodiment, the first guide member 141 and the second guide member 142 may be formed of a material including low-density conductive plastic. The low-density conductive plastic may be a low-density conductive resin. A low-density plastic material has flexible properties, and thus, may facilitate an elastic behavior.

Pores, present in the deformation absorbing member 120, may serve as a path along which an electrolyte of an electrolyte solution and may serve to enable expansion and contraction of the deformation absorbing member 120. When a porosity of the deformation absorbing member 120 is 50% or more to 70% or less, the elastic behavior of the deformation absorbing member 120 may be facilitated while preventing durability of the deformation absorbing member 120 from being deteriorated.

In addition, when the porosity of the deformation absorbing member 120 is 50% or more to 70% or less, electrical conductivity of the deformation absorbing member 120 may be prevented from being reduced. In addition, when the porosity of the deformation absorbing member 120 is 50% or more to 70% or less, the deformation absorbing member 120 may be more easily expanded or contracted by the negative electrode mixture.

However, when the porosity is less than 50%, electrical conductivity may be significantly reduced, and the ease of elastic behavior of the deformation absorbing member 120 may be relatively reduced. Accordingly, ability for the deformation absorbing member 120 to be contracted by expansion of at least one of the negative electrode 110 and the positive electrode 130 may be reduced.

In addition, when the porosity is greater than 70%, the rigidity of the deformation absorbing member 120 may be relatively reduced and it may be difficult for the deformation absorbing member 120 to maintain a shape thereof.

In another exemplary embodiment, the deformation absorbing member 120 may be formed of a material containing polyacetylene. The polyacetylene may be iodized to have electrical conductivity, and a carbon-based filler may be mixed therewith to further improve electrical conductivity.

In an exemplary embodiment, the carbon-based filler may be carbon black (CB), carbon fiber (CF), carbon nanotubes (CNT), or the like.

As described above, the deformation absorbing member 120 has elasticity. Therefore, when the negative electrode mixture 112 contracts in the Z-axis direction, the deformation absorbing member 120 may be stretched by the first negative electrode current collector 111*a* and the second negative electrode current collector 111*b* to expand in the Z-axis direction and to recover an initial thickness thereof.

The positive electrode 130 may include a positive electrode current collector 131, separated from the negative electrode 110 by the separator 140, and a positive electrode mixture 132 applied to one surface and the other surface of the positive electrode current collector 131.

The positive electrode mixture 132 is applied to each of one surface and the other surface of the positive electrode current collector 131 and may be in the form of a slurry in which a positive electrode active material, a binder, a conductive material, a dispersant, and the like, are mixed and stirred. The positive electrode mixture 132 may be applied to each of one surface and the other surface of the positive electrode current collector, and may then be pressurized and dried. The positive electrode active material may include a compound reversibly intercalating and deintercalating lithium ions.

The positive electrode current collector 131 may be formed of a material including aluminum, stainless steel, nickel, titanium, copper, or alloys thereof.

In a process of charging and discharging the battery cell 100, not only the negative electrode 110 but also the positive electrode 130 may expand or contract. Therefore, deformation absorbing member 120 may be pressurized even by the expansion of the positive electrode mixture 132 and may be expanded by contraction of the positive electrode mixture 132. Such a phenomenon may occur when the deformation absorbing member 120 is bonded to the first negative electrode current collector 111*a* and the second negative electrode current collector 111*b*, when the negative electrode mixture 112 included in the negative electrode 110 contacts the separator 140, when the separator 140 contacts the positive electrode mixture 132 applied to the positive electrode current collector 131, and when the separation membrane 140 contacts the case 101.

Figure 2:
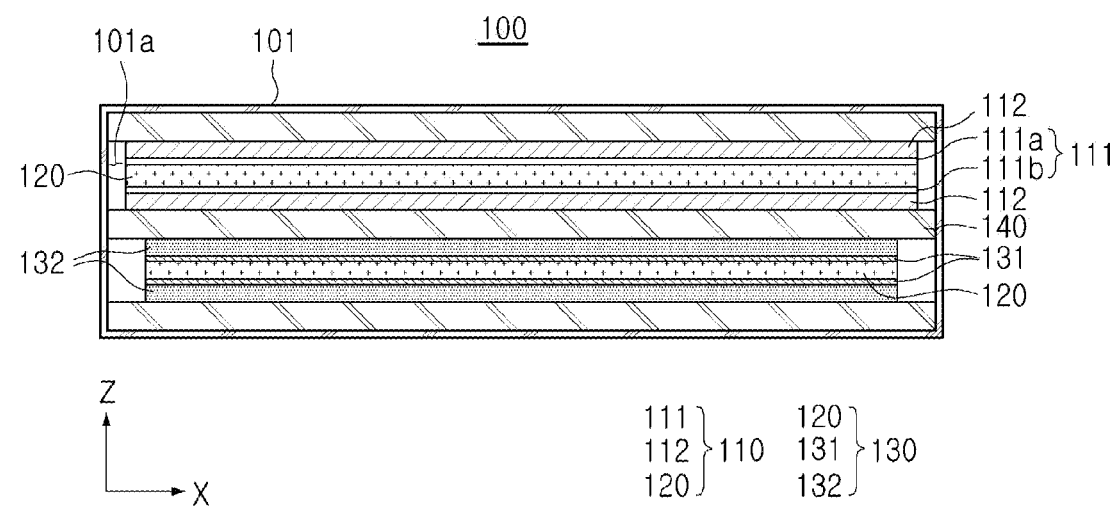
FIG. 2 is a schematic view illustrating a structure of a battery cell according to an exemplary embodiment in the present disclosure.

A structure of a battery cell 100 according to another exemplary embodiment is illustrated in FIG. 2.

As illustrated of FIG. 2, in an exemplary embodiment, a deformation absorbing member 120 may also be provided on a positive electrode 130 to deal with a change in thickness of a positive electrode mixture 132.

The deformation absorbing member 120 may be interposed between a pair of positive electrode current collectors 131 in the same principle as the negative electrode 110, and may be bonded to the positive electrode current collector 131 by an adhesive.

In this case, the positive electrode mixture 132 may be applied to one surface of a single positive electrode current collector 131, and the deformation absorbing member 120 may be bonded to the other surface of the single positive electrode current collector 131. In addition, the deformation absorbing member may be bonded to another positive electrode current collector 131, and a positive electrode mixture 132 may be applied to a surface, opposing a surface to which the deformation absorbing member 120 is adhered, of the positive electrode current collector 131.

The deformation absorbing member 120 may continuously contact the positive electrode current collector 131 in a cross-section in the Z-axis direction. A principle of application and an effect thereof may be the same as the principle and effect in which the deformation absorbing member 120 is provided in the above-described negative electrode 110.

Figure 3:
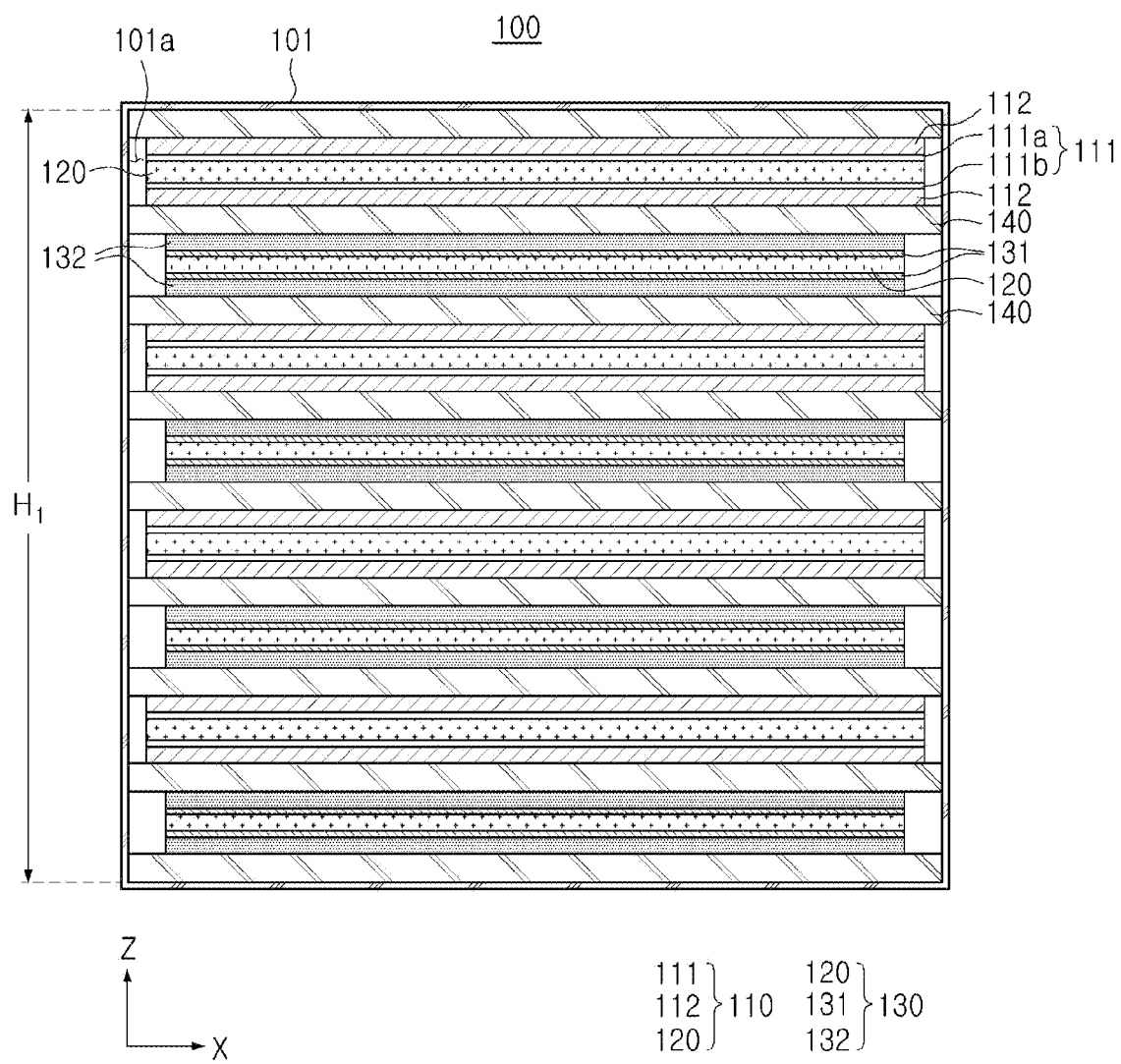
FIG. 3 is a schematic view illustrating a structure of a battery cell according to an exemplary embodiment in the present disclosure.

FIG. 3 is a schematic view illustrating a structure of a battery cell 100 according to another exemplary embodiment.

As illustrated of FIG. 3, the battery cell 100 according to another exemplary embodiment may include a plurality of negative electrodes 110 and a plurality of positive electrodes 130, and a separator 140 may be interposed between the negative electrode 110 and the positive electrode 130. The separator 140 may serve to prevent short-circuits.

The separator 140 may be present between the cathode 110 and the anode 130 in such a manner that a plurality of separators 140 are prepared and stacked between the cathode 110 and the anode 130. Alternatively, the separator 140 may be present between the negative electrode 110 and the positive electrode 130 in a Z-folding manner in which a single separator 140 is prepared and disposed between the negative electrode 110 and the positive electrode 130 in a zigzag pattern. However, exemplary embodiments are not limited thereto.

When a plurality of negative electrodes 110 and a plurality of positive electrodes 130 are provided, both the negative electrodes 110 and the positive electrodes 130 present inside the case 101 may include a deformation absorbing member 120, or only a portion of the negative electrodes 110 and only a portion of positive electrodes 130 may include the deformation absorbing member 120. However, this is not limited by the present disclosure and may be appropriately selected and applied by physical properties of the negative electrode mixture 112 or the positive electrode mixture 132, a usage environment of the battery cell 100, and/or specifications required for the battery cell 100.

In an exemplary embodiment, a width of the electrode assembly in a Z-axis direction in a state, in which all deformation-absorbing members 120 present in the accommodation space 101*a* expand by a maximum value in the Z-axis direction, may be at least the same a width H1 of the accommodation space 101*a* in the Z-axis direction. Accordingly, swelling of the case 101 may be prevented from occurring, and the case 101 may be prevented from being deformed. The electrode assembly may include a positive electrode 110, a negative electrode 130, a separator 140, and a deformation absorbing member 120.

Electrode tabs (not illustrated) may be led out from the negative electrode 110 and the positive electrode 130 of the battery cell 100 to be exposed outwardly of the case 101, respectively. Members such as a tape (not illustrated) for preventing insulation and damage may be additionally provided between an internal surface of the case 101 and the electrode tab (not illustrated).

Figure 4:
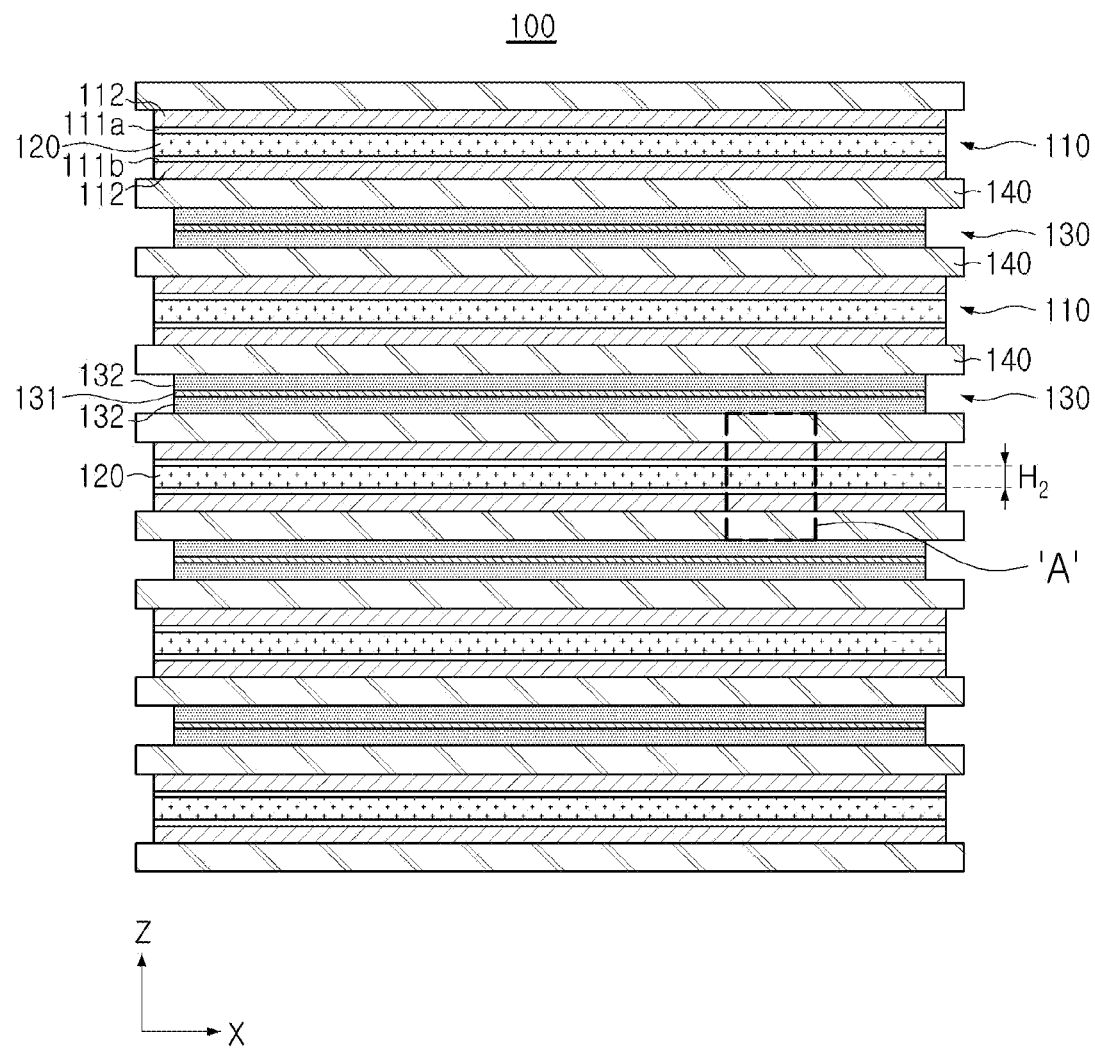
FIG. 4 is a schematic view illustrating a structure of an electrode assembly of a battery cell according to another exemplary embodiment in the present disclosure.

FIG. 4 is a schematic view illustrating a structure of a battery cell 100 formed by stacking a negative electrode 110, a positive electrode 130, a separator 140, and a deformation absorbing member 120 according to another exemplary embodiment.

The deformation absorbing member 120 may be provided on the negative electrode 110. A plurality of negative electrodes 110 and a plurality of positive electrodes 130 may be provided and stacked in the Z-axis direction, and a separator 140 may be present between the negative electrode 110 and the positive electrode 130.

The separator 140 may be present between the negative electrode 110 and the positive electrode 130 by a method of stacking a plurality of separators 140 or a method of folding a single separator 140 as described above.

In an exemplary embodiment, elements related to the negative electrode 110 may satisfy Equation 1.

$$c-c'=d(e-1),\qquad \text{Equation 1}$$

where c is an initial thickness of the deformation absorbing member 120, provided on the negative electrode 110, in the Z-axis direction, c' is a maximum deformable thickness of the deformation absorbing member 120, d is an initial thickness of a single negative electrode mixture 112 in the Z-axis direction, and e is a ratio of a thickness of the single negative electrode mixture 112 expanding in the Z-axis direction to an initial thickness of the single negative electrode mixture 112 in the Z-axis direction. The single negative electrode mixture 112 refers to a negative electrode mixture 112 coated on the first negative electrode current collector 111*a* or a negative electrode mixture 112 coated on the second negative electrode current collector 111*b*.

The initial thickness may have a thickness value when state of health (SOH) is 100% and SOC is 0%, and may be a thickness in a state in which a change amount of the thickness is zero (0). The SOH value is a value indicating a state of lifespan of a battery cell, and a unit thereof may be represented by [%]. The SOH value is a value which may be estimated using voltage, temperature, and current values of the battery cell, rather than a quantitatively measurable value. A decrease in the SOH value means that, when the battery cell is fully charged, a value of output current is decreased with respect to an initial value.

In Equation 1, the maximum deformable thickness c' of the deformation absorbing member 120 in the Z-axis direction may be obtained using a volume change rate "g" depending on a porosity of low-density conductive plastic, constituting the deformation absorbing member 120, and Equation 2.

$$c'=cg\qquad \text{Equation 2}$$

The porosity of the low-density conductive plastic constituting the deformation absorbing member 120 and the volume change rate "g" depending on the porosity may be inherent physical property values of the low-density conductive plastic, and may be values provided by a manufacturer of low-density conductive plastic.

In an exemplary embodiment, the porosity of the low-density conductive plastic constituting the deformation absorbing member 120 may be 50%. In addition, when the porosity of the deformation absorbing member 120 is 50%, the volume change rate "g" of the deformation absorbing member 120 may be 50%. Even when materials have the same porosity, volume change rates of the materials may be different from each other due to inherent property values of the materials.

In an exemplary embodiment, when the thickness of the deformation absorbing member 120 in the Z-axis direction is set to 27.5 μm while allowing the thickness expansion amount of the negative electrode mixture 112 of the battery cell 100 to be 25%, Equation 1 and Equation 2 may be used as follows. The thickness expansion amount is a value set more stably considering that the typical expansion amount of the negative electrode mixture 112 of the battery cell 100 is 10% or more to 20% or less.

The initial thickness c of the deformation absorbing member 120 in the Z-axis direction to be applied to Equation 1 and Equation 2 is 27.5 μm.

The maximum deformable thickness c' of the deformation absorbing member 120 is 27.5×0.5 because c'=cg as described in Equation 2. According to the calculation, the deformation absorbing member 120 may contract by a maximum of 13.75 μm from the initial thickness c.

A ratio "e" of an expanding thickness of a single negative electrode mixture 112 in the Z-axis direction to an initial thickness of the single negative electrode mixture 112 in the Z-axis direction is 125%. Therefore, the ratio "e" is 1.25. Equation 1 may be used to obtain a thickness of the single negative electrode mixture 112 having a maximum expansion amount of 13.75 μm while satisfying the ratio "e."

A value of an initial thickness "d" of the single negative electrode mixture 112 in the Z-axis direction may be obtained by substituting the above values into Equation 1. Therefore, the value of the initial thickness "d" of one negative electrode mixture 112 in the Z-axis direction may be set to 55 μm.

Since the above value is a thickness of the negative electrode mixture 112 coated on the first negative current collector 111*a* or the second negative current collector 111*b*, a thickness 2d of the negative electrode mixture 112 coated on each of the first negative current collector 111*a* and the second negative current collector 111*b* may be 110 μm. In this case, the initial thickness c of the deformation absorbing member 120 may be 55 μm, twice of the initial thickness c, to correspond to doubling of a thickness of the negative electrode mixture 112.

When Equation 1 and Equation 2 are used to design the battery cell 100, an initial thickness of the negative electrode mixture 112 which may prevent deformation of the case (101 of FIG. 3) of the battery cell 100 may be set.

The above-described Equation 1 and Equation 2 may be applied to the positive electrode 130, provided with the deformation absorbing member 120, in the same principle.

The deformation of the case (101 of FIG. 3) may include a phenomenon in which a width between the external surfaces of the case 101 in the direction, parallel to the Z-axis, is increased in FIG. 3, a phenomenon in which the width between the external surfaces of the case 101 in the direction, parallel to the Z-axis, varies along the X-axis, a phenomenon in which the external or internal surface of the case 101 is curved, and the like.

In an exemplary embodiment, the deformation absorbing member 120 has a porosity of 50%. When the porosity is 50%, the deformation absorbing member 120 may be formed of a material including low-density plastic having a volume change rate of 50%.

In an exemplary embodiment, a thickness of the entire negative electrode 110 present in the accommodation space 101*a* in the Z-axis direction may be 4 mm or more to 5 mm or less.

In an exemplary embodiment, the thickness of each of the first negative current collector 111a and the thickness of the second negative current collector 111b in the Z-axis direction may be 5 μm, and the negative electrode mixture 112 may be coated on each of the first negative current collector 111a and the thickness of the second negative current collector 111b to have a thickness of 55 μm in the Z-axis direction.

When a total thickness of the negative electrode mixture 112, coated on each of the first negative electrode current collector 111a and the second negative electrode current collector 111b, is 110 μm and a thickness of the negative electrode mixture 112 when extending by a maximum value in the Z-axis direction is 125% of the initial thickness, the initial thickness of the deformation absorbing member 120 present in the single negative electrode 110 according to Equation 1 and Equation 2 may be determined to be 55 μm.

Accordingly, the deformation absorbing member 120 may contract by a maximum value of the thickness change value of the negative electrode mixture 112 having an initial thickness of 110 μm. While the thickness of the negative electrode mixture 112 expands to 25% from the initial thickness, the deformation absorbing member 120 may contract by the amount of expansion of the negative electrode mixture 112. Therefore, a total thickness of the electrode assembly of the battery cell 100 in the Z-axis direction may not be changed.

When the width (H1 of FIG. 3) of the accommodation space (101a of FIG. 3) in the direction parallel to the Z-axis is designed in consideration of the above-described features, deformation of the case (101 of FIG. 3) caused by the electrode assembly of the battery cell 100 may be prevented. The above-described matters are equally applicable to the positive electrode 130.

A thickness of the entire negative electrode mixture 112, present in the accommodation space (101a of FIG. 3), in the Z-axis direction may expand by about 10 to 20% on average as compared with the initial thickness thereof while a state of charge (SOC) changes from 0% to 100% and SOH decrease from 100%. The amount of increasing the total thickness of the negative electrode mixture 112 may be further increased as the amount of charge of the battery cell 100 is increased and as the battery cell 100 is deteriorated.

The amount of increasing the total thickness of the negative electrode mixture 112 may vary depending on the characteristics of the negative electrode active material and the degree of deterioration of the battery cell 100, but the negative electrode mixture 112 may expand by an average of about 10 to 20%. Therefore, as described above, when the expansion amount of the negative electrode mixture 112 is taken into consideration up to 25%, the width H1 of the accommodation space 101a of the case 101 may be more stably designed.

As illustrated of FIG. 4, when the deformation absorbing member 120 is present in only the negative electrode 110, the width (H1 of FIG. 3) of the accommodation space (101a of FIG. 3) in a direction, parallel to the Z-axis direction, may have a value of 8 mm or more to 11 mm or less. This value may be an initial value when the SOH of the battery cell 100 is 100% and the SOC of the battery cell 100 is 0%, and the width (H1 of FIG. 3) of the accommodation space (101a of FIG. 3) in the direction, parallel to the Z-axis direction, may be maintained even while the SOH of the battery cell 100 is decreased and the SOC of the battery cell 100 is increased.

In an exemplary embodiment, when the width (H1 of FIG. 3) of the accommodation space (101a of FIG. 3) in the direction, parallel to the Z-axis direction, has a value of 8 mm or more to 11 mm or less, 31 positive electrodes 110 and 30 negative electrodes 130 may be provided in the accommodation space (101a of FIG. 3). In addition, the deformation absorbing member 120 may be present in the negative electrode 110, and 31 deformation absorbing members 120 may be provided. Then, a total thickness of the negative electrode 110 having the deformation absorbing member 120 in the Z-axis direction may have a value of 5 mm or more to 6 mm or less, and a total thickness of the positive electrode 130 in the Z-axis direction may have a value of 3 mm or more to 4 mm or less.

The separator 140 may be interposed between the negative electrode 110 and the positive electrode 130, and a total thickness of the separator 140 in the accommodation space (101a of FIG. 3) in the Z-axis direction may be 0.9 mm or more to 1 mm or less.

Accordingly, even when each of the negative electrode mixture 112 and the positive electrode mixture 132 expand by 25% with respect to an initial thickness, the electrode assembly of the battery cell 100 and the internal surface of the case (101 of FIG. 3) may not be in contact with each other. Thus, deformation of the case (101 of FIG. 3) caused by expansion of the negative electrode 110 or the positive electrode 130 in the Z-axis direction may be prevented.

When the cross-sectional shape of the case (101 of FIG. 3) is not a rectangle, a maximum width, among widths of the accommodation space (101a of FIG. 3) of the case (101 of FIG. 3) in the direction, parallel to the Z-axis direction, may be 8 mm or more to 11 mm or less.

A first initial thickness H2, at which a thickness deformation amount of the deformation absorbing member 120 is zero (0), may be a thickness in a state in which the negative electrode 110 and the positive electrode 130 do not expand or contract. In an exemplary embodiment, the width (H1 of FIG. 3) of the accommodation space (101a of FIG. 3) in the direction, parallel to the Z-axis direction, may have a value of 8 mm or more to 11 mm or less and, when the deformation absorbing member 120 is only present on the negative electrode 110, the first initial thickness H2 of the single deformation absorbing member 120 may be 27 μm or more to 30 μm or less. The first initial thickness H2 of one of the deformation absorbing member 120 may be adopted within the above range in consideration of errors in processing of elements of the battery cell 100, physical properties of the active material included in the negative electrode mixture 112 and the positive electrode mixture 132, and the like.

Figure 5:
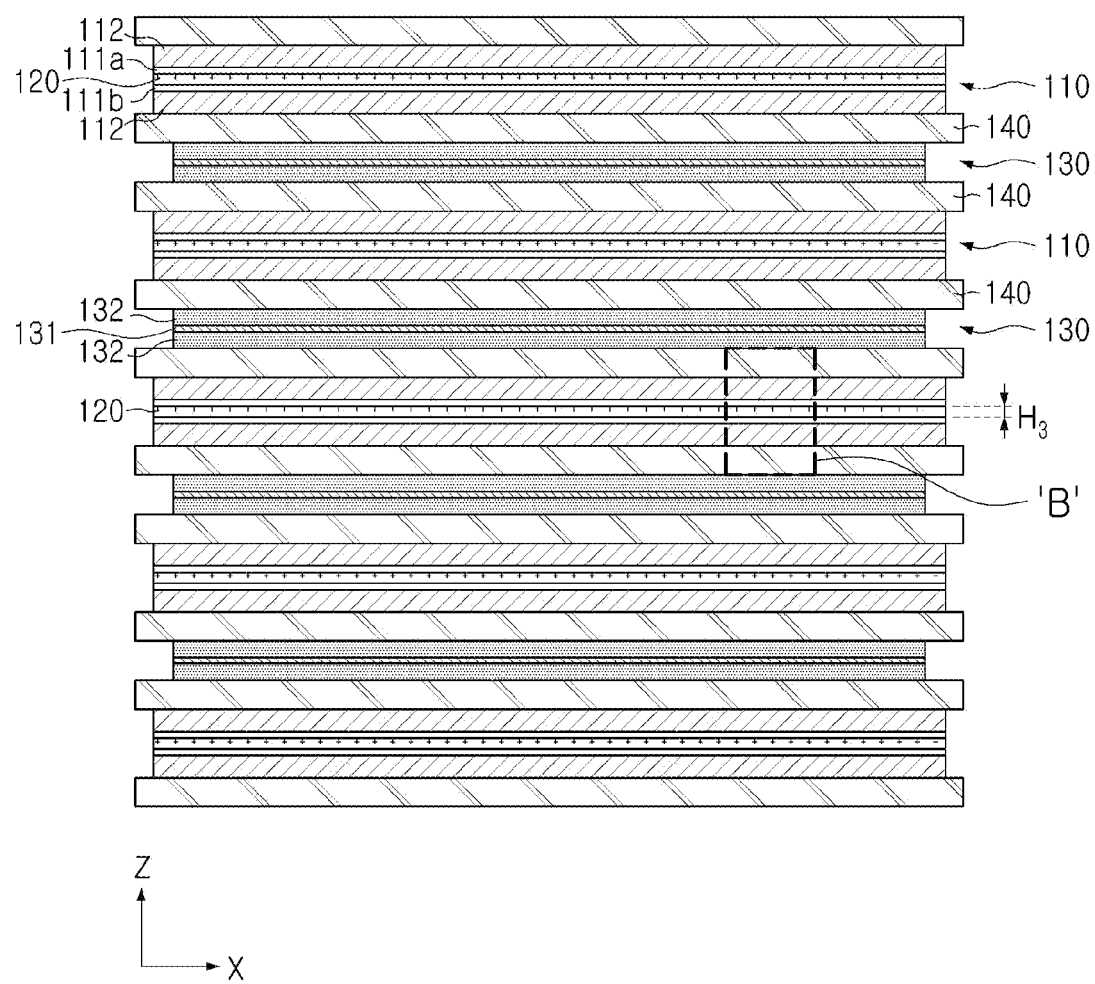
FIG. 5 is a schematic view illustrating a state in which a deformation absorbing member of FIG. 4 is contracted.

A state, in which the deformation absorbing member 120 of FIG. 4 contracts, is schematically illustrated in FIG. 5.

As illustrated of FIG. 5, when the negative electrode mixture 112 expands to cause an increase in thickness, the thickness of one of the deformation absorbing members 120 may be a first deformation thickness H3. The first deformed thickness H3 may have a value obtained by subtracting an amount, by which the thickness of the single negative electrode mixture 112 has expanded, from the first initial thickness (H2 of FIG. 4). Such a change in the thickness of the deformation absorbing member 120 may occur in all of the deformation absorbing members 120 provided in the plurality of negative electrodes 110.

Figure 6:
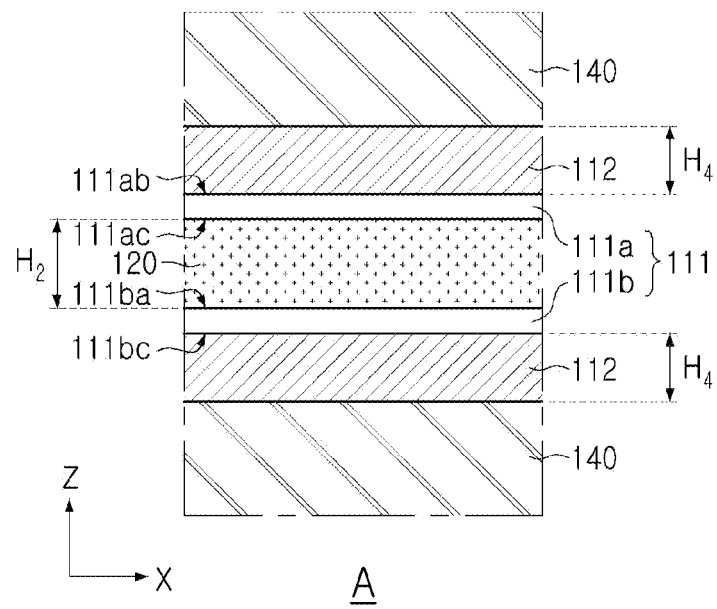
FIG. 6 is a view of "A" of FIG. 4.

An enlarged view of "A" of FIG. 4 is illustrated in FIG. 6.

As illustrated in FIG. 6, the negative electrode mixture 112 may be coated on the first surface 111ab of the first negative electrode current collector 111a, and the deformation absorbing member 120 may be bonded to the second surface lilac of the first negative electrode current collector 111a.

In addition, the deformation absorbing member 120 bonded to the second surface lilac of the first negative electrode current collector 111a may be bonded to the first surface 111ba of the second negative electrode current collector 111b, and the negative electrode mixture 112 may be coated on the second surface 111ba of the second negative electrode current collector 111b.

In an exemplary embodiment, the negative electrode mixture 112 may be coated on end surfaces of the first negative electrode current collector 111a and the second negative electrode current collector 111b. In the first negative electrode current collector 111a and the second negative electrode current collector 111b, the deformation absorbing member 120 may be bonded to a surface on which the negative electrode mixture 112 is not coated. When a plurality of negative electrodes (110 of FIG. 4) are provided, the deformation absorbing member 120 may be present for each negative electrode (110 of FIG. 4).

A state illustrated in FIG. 6 is an initial state in which the negative electrode mixture 112 does not expand or contract. In this state, a thickness of the negative electrode mixture 112, coated on the first negative electrode current collector 111a, and a thickness of the negative electrode mixture 112, coated on the second negative electrode current collector 111b, may each have the second initial thickness H4.

FIG. 6 illustrates the case in which the thickness of the negative electrode mixture 112 applied to the first negative electrode current collector 111a and the thickness of the negative electrode mixture 112 applied to the second negative electrode current collector 111b have the same value, and exemplary embodiments are not limited thereto. In some cases, thickness of the negative electrode mixture 112, coated on the first negative electrode current collector 111a, and the thickness of the negative electrode mixture 112, coated on the second negative electrode current collector 111b, may be different from each other.

A thickness of the single separator 140 interposed between the single negative electrode (110 of FIG. 4) and the single positive electrode (130 of FIG. 4) may be at least 15 μm. In the accommodation space (101a of FIG. 3), a total thickness of the separators 140 interposed between the respective negative electrodes (110 of FIG. 4) and the respective positive electrodes (130 of FIG. 4) may be 0.9 mm or more to 1 mm or less.

The above-described values are initial thickness values of the electrode assembly according to the width (H1 of FIG. 3) of the accommodation space (101a of FIG. 3) of the case (101 of FIG. 3) in an initial state, a state before the thickness deformation of the electrode assembly of the battery, and are summarized in the following Table 1.

TABLE 1

| | |
|---|---|
| Thicknesses of first negative electrode current collector and second negative electrode current collector (μm) | 5 |
| Thickness of each of negative electrode mixture coated on first negative electrode current collector and negative electrode mixture coated on second negative electrode current collector (μm) | 55 |
| Sum of thicknesses of plurality of negative electrodes (mm) | 5~6 |
| Sum of thicknesses of plurality of positive electrodes (mm) | 3~4 |
| Thickness of single deformation absorbing member (μm) | 27~30 |
| Sum of thicknesses of separators stacked in width thickness of accommodation space (mm) | 0.9~1 |

The number and thickness values of the above-described negative electrode (110 of FIG. 4), positive electrode (130 of FIG. 4), separator 140, and deformation absorbing member 120 may be initial values of the negative electrode (110 of FIG. 4), the positive electrode (130 of FIG. 4), the separator (140 of FIG. 4), and the strain absorbing member (120 of FIG. 4) when the SOH value of the battery cell is 100% and the SOC value of the battery cell is 0%.

In this state, when the SOC reaches 100%, a thickness of at least one of the negative electrode mixture 112 and the positive electrode mixture (132 of FIG. 4) expands. In the present disclosure, the deformation absorbing member 120 may contract by the thickness expansion amount.

Accordingly, in the present disclosure, even when the SOC reaches 100%, a total thickness of the electrode assembly of the battery cell (100 of FIG. 4) in the Z-axis direction may not be changed. Therefore, the exterior of the case (101 of FIG. 3) of the battery cell (100 of FIG. 3) may be prevented from being deformed while the SOC reaches 100% from 0%. In the present disclosure, the electrode assembly refers to the negative electrode 110, the positive electrode 130, the separator 140, and the deformation absorbing member 120, as described above.

Accordingly, when the battery cell (100 of FIG. 3) is configured with the above-described values, swelling of the case (101 of FIG. 3) of the battery cell (100 of FIG. 3) may not occur even while the SOC reaches 100% from 0% SOC Ring phenomenon. Therefore, an additional member absorbing swelling of the case (101 of FIG. 3) does not need to be provided outside the case (101 of FIG. 3).

Figure 7:
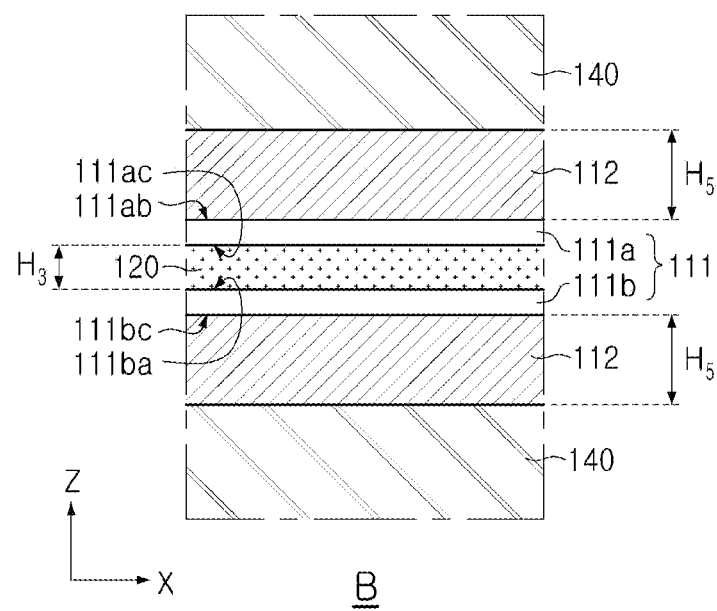
FIG. 7 is a view of "B" of FIG. 5.

An enlarged view of "B" of FIG. 5 is illustrated in FIG. 7.

FIG. 7 illustrates a state in which the SOH of the battery cell (100 of FIG. 3) is 60% and the SOC thereof is 100%.

The state illustrated of FIG. 7 is a state in which the negative electrode mixture 112 expands, and a thickness of the negative electrode mixture 112 coated on the first negative electrode current collector 111a and a thickness of the negative electrode mixture 112 coated on the second negative electrode current collector 111b may each have a second deformed thickness H5. The second deformation thickness H5 may have a value, greater than a value of the second initial thickness (H4 of FIG. 6).

As the thickness of the negative electrode mixture 112 is increased, the thickness of the deformation absorbing member 120 may be decreased, so that the single deformation absorbing member 120 may have the first deformation thickness H3. The first initial thickness (H2 of FIG. 6) may have a value, greater than a value of the first deformed thickness H3.

When the battery cell (100 of FIG. 3) enters a state in which the degree of deterioration is 40% with respect to the initial state (60% of SOH) and SOC is 100%, the thickness of the negative electrode mixture 112 may generally expands by about 20%. In an exemplary embodiment, the width (H1 of FIG. 3) of the accommodation space (101a of FIG. 3) of the case (101 of FIG. 3) may have a value of 8 mm or more to 11 mm or less, which may be a value the same as and the width (H1 of FIG. 3) of the accommodation space (101a of FIG. 3) of the case (101 of FIG. 3) in a state in which SOH is 100% and SOC is 0%.

Deformation thicknesses of the thicknesses of the components of the electrode assembly, listed in Table 1, are summarized in Table 2 below when the SOH is 60% and the SOC is 100%.

TABLE 2

| | |
|---|---|
| Thicknesses of first negative electrode current collector and second negative electrode current collector (μm) | 5 |

TABLE 2-continued

| | |
|---|---|
| Thickness of each of negative electrode mixture coated on first negative electrode current collector and negative electrode mixture coated on second negative electrode current collector (μm) | 66 |
| Sum of thicknesses of plurality of negative electrodes (mm) | 4~5 |
| Sum of thicknesses of plurality of positive electrodes (mm) | 3~4 |
| Thickness of single deformation absorbing member (μm) | 5~8 |
| Sum of thicknesses of separators stacked in width thickness of accommodation space (mm) | 0.9~1 |

As illustrated in Table 2, a total thickness of the electrode assembly of the battery cell (100 of FIG. 3) in the Z-axis direction may not be changed because the deformation absorbing member 120 contracts as much as the negative electrode mixture 112 expands.

In the battery cell (100 of FIG. 3) according to an exemplary embodiment, when the SOH has a value of 60% or more to 100% or less and the SOC has a value of 0% or more to 100% or less, the case (of FIG. 3) 101) may not be deformed by the electrode assembly of the battery cell (100 of FIG. 3).

Figure 8:
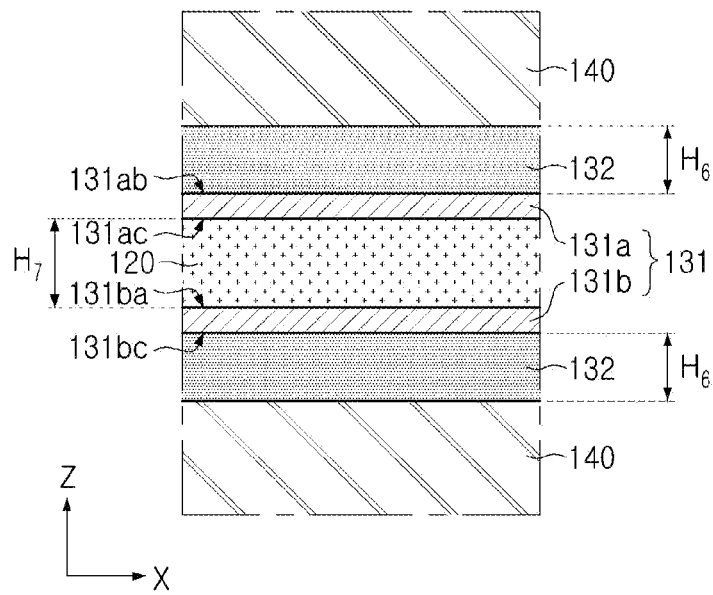
FIG. 8 is a partially enlarged view of an electrode assembly of a battery cell according to another exemplary embodiment in the present disclosure.

FIG. 8 is a partially enlarged view of an electrode assembly of a battery cell according to another exemplary embodiment.

A state illustrated of FIG. 8 is a state of the positive electrode (130 of FIG. 3) when the SOH of the battery cell (100 of FIG. 3) is 100% and the SOC thereof is 0%. The positive electrode current collector 131 may include a first positive electrode current collector 131*a* and a second positive electrode current collector 131*b*.

A positive electrode mixture 132 may be coated on a first surface 131*ab* of the first positive electrode current collector 131*a*, and a deformation absorbing member 120 may be bonded to a second surface 131*ac* of the first positive electrode current collector 131*a*.

The deformation absorbing member 120 may be bonded to the first surface 131*ba* of the second positive electrode current collector 131*b*, and a positive electrode mixture 132 may be coated on the second surface 131*bc* of the second positive electrode current collector 131.

In a cross-section of the positive electrode (130 of FIG. 3) in a thickness direction, the deformation absorbing member 120 may continuously contact the first positive electrode current collector 131*a* and the second positive electrode current collector 131*b* in a width direction of the positive electrode (130 of FIG. 3).

Accordingly, expansion and contraction of the positive electrode mixture 132 may be dealt with in width direction of the entire first and second positive electrode current collectors 131*a* and 131*b*, and binding between the deformation absorbing member 120 and the first positive electrode current collector 131*a* and the second positive electrode current collector 131*b* may be maintained to be firm.

When a plurality of positive electrodes (130 of FIG. 3) are provided, the deformation absorbing member 120 may be present for each positive electrode (130 of FIG. 3).

A third initial thickness H7 when SOH of the deformation absorbing member 120, present in the positive electrode current collector 131, is 100% and SOC thereof is 0% may be 27 μm or more to 30 μm or less. In this case, a thickness of a single first positive electrode current collector 131*a* and a thickness of a single second positive electrode current collector 131*b* may each have a fourth initial thickness H6, and a value of the fourth initial thickness H6 may be at least 5 μm.

A thickness of the positive electrode mixture 132, coated on the first positive electrode current collector 131*a*, and a thickness of the positive electrode mixture 132, coated on the second positive electrode current collector 131*b*, may each be at least 55 μm.

A thickness of a separator 140 interposed between one negative electrode (110 of FIG. 3) and one positive electrode (130 of FIG. 3) may be at least 15 μm.

A sum of thicknesses of the plurality of positive electrodes (130 of FIG. 3), present in the accommodation space (101*a* of FIG. 3), may be 3 mm or more to 4 mm or less.

A width (H1 of FIG. 3) of the accommodation space (101*a* of FIG. 3) of the case (101 of FIG. 3) may be 8 mm or more to 11 mm or less.

Figure 9:
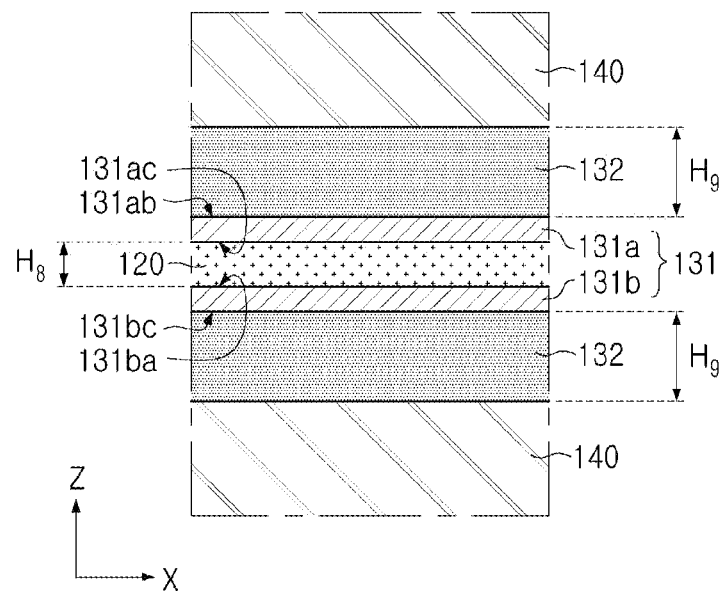
FIG. 9 is a schematic view illustrating a state in which a deformation absorbing member of FIG. 8 contracts.

FIG. 9 is a schematic view illustrating a state in which the deformation absorbing member 120 of FIG. 8 contracts. FIG. 9 illustrates a state of the positive electrode (130 of FIG. 3) when SOH is 60% and SOC is 100%.

As illustrated in FIG. 9, the thickness of the deformation absorbing member 120 decreases from the third initial thickness (H7 of FIG. 8) to the third deformation thickness H8, and the third deformation thickness H8 may be 5 μm or more to 8 μm or less.

A thickness of the positive electrode mixture 132, coated on the first positive electrode current collector 131*a*, and a thickness of the positive electrode mixture 132, coated on the second positive electrode current collector 131*b*, may each increase from the fourth initial thickness (H6 of FIG. 8) to the fourth deformable thickness H9, and the fourth deformable thickness H9 may be at least 66 μm.

As described above, the deformation absorbing member 120 may be provided on at least one of the negative electrode (110 of FIG. 3) and the positive electrode (130 of FIG. 3). In this case, when the thicknesses of the negative electrode mixture (112 of FIG. 3) and the positive electrode mixture (132 of FIG. 3) are increased, the thickness of the deformation absorbing member 120 may be decreased. Meanwhile, when the thickness of the negative electrode mixture (112 of FIG. 3) and the positive electrode mixture (132 of FIG. 3) are decreased, the thickness of the deformation absorbing member 120 may be increased.

Therefore, a change in the thicknesses of the negative electrode mixture (112 of FIG. 3) and the positive electrode mixture (132 of FIG. 3) may be dealt with without changing the exterior of the case (101 of FIG. 3) of the battery cell (100 of FIG. 3). In addition, the change in the thicknesses of the negative electrode mixture (112 of FIG. 3) and the positive electrode mixture (132 of FIG. 3) may be dealt with inside the case (101 of FIG. 3), rather than outside the case (101 of FIG. 3).

In the battery cell (100 of FIG. 3) according to an exemplary embodiment, when the SOH has a value of 60% or more to 100% or less and the SOC has a value of 0% or more to 100% or less, the case (101 of FIG. 3) may not be deformed by an electrode assembly.

According to another aspect, a battery module including the battery cell according to the present disclosure is provided.

Figure 10:
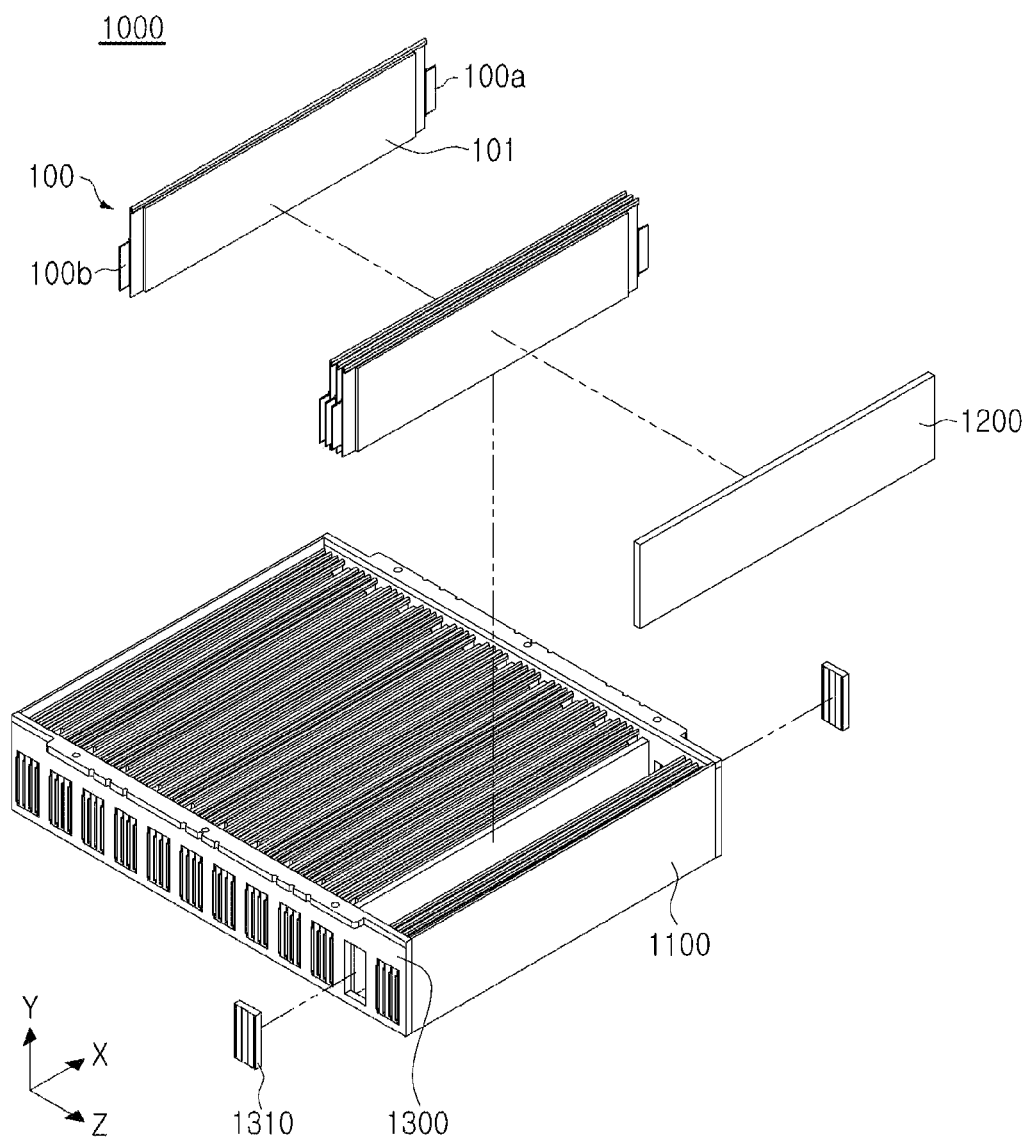
FIG. 10 is an exploded perspective view of a battery module according to an exemplary embodiment in the present disclosure.

FIG. 10 is an exploded perspective view of a battery module 1000 according to an exemplary embodiment. As illustrated in FIG. 10, the battery module 1000 may include a plurality of battery cells (100 of FIGS. 1 to 4 and FIG. 10).

The battery module 1000 may accommodate a plurality of the battery cells 100 in the module housing 1100. The module housing 1100 may be formed of a material having a rigidity of a predetermined level or higher, and a shape thereof may be maintained while the battery cell 100 is accommodated therein.

A plurality of battery cells 100 may be stacked inside the module housing 1100, and a pad 1200 may be provided between the battery cells 100.

The pad 1200 may contact the case 101 of the battery cell 100 to provide a surface pressure. In addition, in an exemplary embodiment, when the pad 1200 is formed of a material having high thermal conductivity, the pad 1200 may provide the surface pressure and may simultaneously perform a cooling function of the case 101.

A positive electrode tab 100*a* of the battery cell 100 may be led out to one side of the case 101 of the battery cell 100, and a negative electrode tab 100*b* may be led out to the other side of the battery cell 100. A direction, in which the positive electrode tab 100*a* and the negative electrode tab 100*b* are led out to the case 101, is not limited by the present disclosure, and the positive electrode tab 100*a* and the negative electrode tab 100*b* may have a form in which they are led out to only one side of the case 101.

The positive electrode tab 100*a* and the negative electrode tab 100*b* may be welded to a busbar member 1310 provided in a busbar frame 1300, and may be electrically connected to the busbar member 1310. The busbar frame 1300 may be fixed to one side of the module housing 1100, and may support the busbar member 1310. The busbar frame 1300 may be formed of a material including an insulating material.

In an exemplary embodiment, the case 101 of the battery cell 100 may be a pouch-type case. An external surface of the case 101 may be formed of a material containing an aluminum alloy, and an internal surface of the case 101 may be formed of a material containing polypropylene.

A negative electrode (110 of FIG. 3), a positive electrode (130 of FIG. 3), a separator (140 of FIG. 3), and a deformation absorbing member (120 of FIG. 3) are stacked in the case 101, and the case 101 may be thermally sealed to seal the accommodation space (101*a* of FIG. 3). In this case, the accommodation space (101*a* of FIG. 3) may be filled with an electrolyte solution.

As described above, when at least one of the negative electrode (110 of FIG. 3) and the positive electrode (130 of FIG. 3) expands or contracts, the deformation absorbing member (120 of FIG. 3) may contract or expand to deal with a change in volume of at least one the negative electrode (110 of FIG. 3) and the positive electrode (130 of FIG. 3).

In this case, the module housing 1100 has a rigidity of a predetermined level or higher, the cases 101 of the battery cells 100 may in close contact with each other in the Z-axis direction, or the case 101 and the pad 1200 may be maintained in a state in close contact in the Z-axis direction. Accordingly, the case 101 may be supported by the module housing 1100 or the pad 1200 in a direction, parallel to a Z-axis.

Therefore, in the battery module 1000 according to an exemplary embodiment, volumes of the negative electrode (110 of FIG. 3), the positive electrode (130 of FIG. 3), and the deformation absorbing member (120 id FIG. 3) may be changed inside the case 101 in the Z-axis direction. In addition, an external surface of the case 101 may not be deformed in the Z-axis direction even when the volumes of the positive electrode (130 of FIG. 3) and the deformation absorbing member (120 of FIG. 3) are changed in the Z-axis direction.

In another exemplary embodiment, a plurality of the battery modules 1000 may be provided. The plurality of battery modules 1000 may be accommodated in a pack housing (not illustrated) to form a battery pack (not illustrated).

As described above, expansion and contraction of an electrode, accommodated in a case, may be dealt with in the case.

In addition, an exterior of a case may not be deformed even when charging and discharging are repeated.

While example embodiments have been shown and described above, it will be apparent to those skilled in the art that modifications and variations could be made without departing from the scope of the present invention as defined by the appended claims.

What is claimed is:

1. A battery cell comprising:
a case provided with an accommodation space; and
an electrode assembly accommodated in the accommodation space and contacting the case,
wherein the electrode assembly comprises:
a negative electrode including a first negative electrode current collector including a negative electrode mixture coated on one surface, a second negative electrode current collector including a negative electrode mixture coated on one surface, and a deformation absorbing member interposed between other surfaces of the first negative electrode current collector and the second negative electrode current collector opposite to the surfaces on which the negative electrode mixtures are coated, wherein the surfaces on which the negative electrode mixtures are coated do not face each other;
a positive electrode including a positive electrode current collector on which a positive electrode mixture is coated; and
a separator interposed between the negative electrode mixture and the positive electrode mixture,
wherein the deformation absorbing member is in continuous contact with the other surfaces of the first negative electrode current collector and the second negative electrode current collector in a width direction of the first negative electrode current collector or the second negative electrode current collector, and the deformation absorbing member is pressurized or stretched by at least one of the negative electrode and the positive electrode to contract or expand.

2. The battery cell of claim 1, wherein the positive electrode includes a plurality of positive electrode current collectors, and
another deformation absorbing member is interposed between surfaces of the positive electrode current collectors, wherein the surfaces are opposing surfaces on which the positive electrode mixture is coated.

3. The battery cell of claim 2, wherein the negative electrode includes a plurality of negative electrodes,
wherein the positive electrode includes a plurality of positive electrodes, and
the separator is disposed between the negative electrodes and the positive electrodes, between each of the negative electrodes and each of the positive electrodes.

4. The battery cell of claim 1, wherein the deformation absorbing member is formed of a material including conductive plastic having a porosity of 50% or more to 70% or less.

5. The battery cell of claim 1, wherein the deformation absorbing member is formed of a material containing polyacetylene.

6. The battery cell of claim 1, wherein the deformation absorbing member is formed of conductive plastic including a carbon-base filler.

7. The battery cell of claim 1, wherein the deformation absorbing member is bonded to at least one of a current collector of the first negative electrode current collector, the second negative electrode current collector and the positive electrode current collector.

8. The battery cell of claim 4, wherein c-c' =d(e-1),
where c is an initial thickness of the deformation absorbing member, c' is a maximum deformable thickness of the deformation absorbing member, d is an initial thickness of the negative electrode mixture, and e is a ratio of an expanding thickness of the negative electrode mixture to an initial thickness of the negative electrode mixture.

9. The battery cell of claim 8, wherein the case is provided to maintain an initial width of the accommodation space in a direction, in which the negative electrode, the separator, and the positive electrode are stacked, while the expanding thickness of the negative electrode mixture has a value of more than 100% to 125% or less of the initial thickness of the negative electrode mixture and the expanding thickness of the positive electrode mixture has a value of more than 100% to 125% or less of the initial thickness of the positive electrode mixture.

10. The battery cell of claim 9,
wherein the negative electrode includes a plurality of negative electrodes,
wherein the positive electrode includes a plurality of positive electrodes, and
the separator is disposed between the negative electrodes and the positive electrodes, between each of the negative electrodes and each of the positive electrodes,
wherein a sum of thicknesses of the plurality of negative electrodes, present in the accommodation space, is 5 mm or more to 6 mm or less, and a sum of thicknesses of the plurality of positive electrodes, present in the accommodation space, is 3 mm or more to 4 mm or less,
a thickness of the separator interposed between the negative electrode and the positive electrode in the accommodation space is at least 15 μm, and
the initial width of the accommodation space in the direction, in which the negative electrode, the separator, and the positive electrode are stacked, is 8 mm or more to 11 mm or less.

11. The battery cell of claim 10, wherein a thickness of one of the negative electrode current collectors of the electrode assembly is at least 5 μm,
the negative electrode mixture of the electrode assembly is coated on one surface of the negative electrode current collector to have a thickness of at least 55 μm, and
a thickness of one of the deformation absorbing members of the electrode assembly is at least 27 μm or more to 30 μm or less.

12. A battery module comprising:
a module housing; and
a battery cell including a case provided with an accommodation space and an electrode assembly accommodated in the accommodation space and contacting the case, the electrode assembly including a negative electrode including a first negative electrode current collector including a negative electrode mixture coated on one surface, a second negative electrode current collector including a negative electrode mixture coated on one surface, and a deformation absorbing member interposed between other surfaces of the first negative electrode current collector and the second negative electrode current collector opposite to the surfaces on which the negative electrode mixtures are coated, wherein the surfaces on which the negative electrode mixtures are coated do not face each other, a positive electrode including a positive electrode current collector on which a positive electrode mixture is coated and a separator interposed between the negative electrode mixture and the positive electrode mixture, wherein the deformation absorbing member is in continuous contact with the other surfaces of the first negative electrode current collector and the second negative electrode current collector in a width direction of the first negative electrode current collector or the second negative electrode current collector, and being pressurized or stretched by at least one of the negative electrode and the positive electrode to contract or expand.

13. The battery module of claim 12, wherein the battery cell includes a plurality of battery cells, and the plurality of battery cells are stacked in the module housing and supported by the module housing.

14. The battery module of claim 13, further comprising:
at least one pad disposed between the battery cells and contacting the battery cell.

15. The battery module of claim 13, wherein the case of the battery cell is a pouch-type case.

16. The battery module of claim 14, wherein the pad is formed of a material having thermal conductivity of 2 W/mK or more to 20 W/mK or less.

* * * * *